(12) United States Patent
Jang et al.

(10) Patent No.: US 9,444,301 B2
(45) Date of Patent: Sep. 13, 2016

(54) MOTOR

(71) Applicant: NEW MOTECH CO., LTD., Gwangju (KR)

(72) Inventors: Jeong Cheol Jang, Gwangju (KR); Chang Ho Cho, Gwangju (KR); Hyun Sung Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 165 days.

(21) Appl. No.: 14/397,489

(22) PCT Filed: Mar. 28, 2013

(86) PCT No.: PCT/KR2013/002586
§ 371 (c)(1),
(2) Date: Oct. 28, 2014

(87) PCT Pub. No.: WO2013/187585
PCT Pub. Date: Dec. 19, 2013

(65) Prior Publication Data
US 2015/0123501 A1 May 7, 2015

(30) Foreign Application Priority Data

Jun. 11, 2012 (KR) .................. 10-2012-0062019

(51) Int. Cl.
*H02K 1/04* (2006.01)
*H02K 5/04* (2006.01)
*H02K 5/08* (2006.01)
*H02K 5/15* (2006.01)
*H02K 5/22* (2006.01)
*H02K 1/18* (2006.01)

(52) U.S. Cl.
CPC ........ *H02K 5/04* (2013.01); *H02K 1/18* (2013.01); *H02K 5/08* (2013.01); *H02K 5/15* (2013.01); *H02K 5/225* (2013.01); *H02K 11/20* (2016.01); *H02K 11/33* (2016.01); *H02K 11/40* (2016.01)

(58) Field of Classification Search
CPC .......... H02K 5/04; H02K 5/08; H02K 5/225; H02K 5/15; H02K 11/40
USPC ........................................... 310/43
See application file for complete search history.

(56) References Cited

U.S. PATENT DOCUMENTS 4,181,393 A * 1/1980 Lill ...................... H01R 4/2462
310/68 C
6,285,107 B1 * 9/2001 Sawada ................ H02K 3/46
310/164

(Continued)

FOREIGN PATENT DOCUMENTS

CN 101588089 B 2/2013
EP 2237393 A1 10/2010

(Continued)

Primary Examiner — Hanh Nguyen
(74) Attorney, Agent, or Firm — Revolution IP, PLLC

(57) ABSTRACT

Disclosed is a motor including: a housing formed by means of insert injection molding in such a manner as to locate a stator assembly inside a mold, the stator assembly having a stator core, an upper insulator adapted to be coupled to the upper side of the stator core, and a lower insulator adapted to be coupled to the lower side of the stator core; a printed circuit board adapted to mount an integrated circuit device thereon; and at least one or more screws adapted to be inserted into screw holes formed on the top peripheral portion of the housing and having screw heads formed thereon, the screw heads being engagedly coupled to the peripheral portion of the end cover and the end portions of the screws being brought into contact with the stator core.

5 Claims, 7 Drawing Sheets

(56) References Cited

U.S. PATENT DOCUMENTS

| | | | |
|---|---|---|---|
| 2004/0108779 A1* | 6/2004 | Boettger | H02K 5/08 310/89 |
| 2006/0186746 A1 | 8/2006 | Nanbu et al. | |
| 2008/0073986 A1 | 3/2008 | Lee | |
| 2011/0234025 A1* | 9/2011 | Kado | H02K 5/08 310/43 |
| 2012/0025746 A1 | 2/2012 | Kawakubo et al. | |
| 2013/0043742 A1* | 2/2013 | Jang | H02K 3/522 310/43 |

FOREIGN PATENT DOCUMENTS

| | | |
|---|---|---|
| JP | 10284193 A | 10/1998 |
| JP | 2004-135416 A | 4/2004 |
| JP | 2004-229429 A | 8/2004 |
| JP | 2007-006603 A | 1/2007 |
| JP | 2008-526175 A | 7/2008 |
| JP | 2009-131127 A | 6/2009 |
| JP | 2009-177984 A | 8/2009 |
| JP | 2010-200501 A | 9/2010 |
| JP | 2011-055703 A | 3/2011 |
| JP | 2011-114979 A | 6/2011 |
| KR | 1020010011780 A1 | 2/2001 |
| KR | 20-0344028 Y1 | 3/2004 |
| KR | 10-0671709 B1 | 1/2007 |
| KR | 10-0883597 B1 | 2/2009 |
| KR | 10-2011-0039785 A | 4/2011 |
| KR | 20-04610000 Y1 | 4/2012 |
| WO | 2007/004429 A1 | 1/2007 |
| WO | 2010/122642 A1 | 10/2010 |

* cited by examiner

MOTOR

CROSS REFERENCE TO PRIOR APPLICATIONS

This application is a National Stage Application of PCT International Patent Application No. PCT/KR2013/002586 filed on Mar. 28, 2013, under 35 U.S.C. §371, which claims priority to Korean Patent Application No. 10-2012-0062019 filed on Jun. 11, 2012, which are all hereby incorporated by reference in their entirety.

TECHNICAL FIELD

The present invention relates to a motor, and more particularly, to a motor that is provided to improve the structure of a housing of a brushless DC (BLDC) motor, thereby preventing a printed circuit board from being damaged upon making the motor, achieving easy assembly, and reducing manufacturing cost.

BACKGROUND ART

Generally, a motor used for an air conditioner external unit or a refrigerator in BLDC motors often do not work because of the occurrence of leakage or corrosion by means of the permeation of rainwater or moisture into a motor housing, and thus, the housing is made of a bulk molding compound (BMC) resin by means of insert injection molding.

A conventional motor, which has the housing made of the BMC resin by means of the insert injection molding, is disclosed in Korean Patent Application Laid-Open No. 10-2011-0039785. According to the structure of the conventional motor, the housing is made through the injection molding with the BMC resin in a state where a printed circuit board is disposed on one side of a stator to perform electrical activation of the stator.

By the way, in the state where the printed circuit board is disposed on one side of the stator, if the stator is located inside a mold to perform the insert injection molding, the injection molding is carried out on relatively high temperature conditions, so that the devices mounted on the printed circuit board may be broken or damaged. In this case, since the motor housing is molded of the BMC resin together with the stator and the printed circuit board, all of them should be thrown away. Accordingly, the entire manufacturing cost becomes undesirably increased.

In the state where the electrical connection of the printed circuit board is finished, furthermore, a radiation plate for radiating the heat generated from an integrated circuit device is mounted, and after that, the insert injection molding is carried out, thereby making it difficult to perform the assembly work and causing the manufacturing process to be complicated.

On the other hand, if a cover of the housing of the motor is made of a metal material, the static electricity, which is generally generated during the rotation of the motor, is generated from a bearing inside the cover, thereby making the bearing unfortunately damaged.

To solve the above-mentioned conventional problems, thus, the inventors propose to a motor having a new structure in which no resin molding can be carried out in a state where the printed circuit board is coupled to the stator and the static electricity generated from the cover of the housing can be removed.

DISCLOSURE OF INVENTION

Technical Problem

Accordingly, the present invention has been made in view of the above-mentioned problems occurring in the prior art, and it is an object of the present invention to provide a motor that is provided to improve a new structure.

It is another object of the present invention to provide a motor that achieves easy assembly.

It is yet another object of the present invention to provide a motor that prevents a bearing from being damaged by means of the generation of static electricity.

It is still another object of the present invention to provide a motor that reduces the manufacturing cost.

It is yet another object of the present invention to provide a motor that is simple in structure and enhances heat radiation efficiency.

The above object and other objects of the present invention will be easily achieved by a preferred embodiment of the present invention as will be described below.

Solution to Problem

To accomplish the above objects, according to a first aspect of the present invention, there is provided a motor including: a housing formed by means of insert injection molding in such a manner as to locate a stator assembly inside a mold and having a hollow portion formed at the inside thereof and power terminal pins exposed above the hollow portion, the stator assembly having a stator core, an upper insulator adapted to be coupled to the upper side of the stator core, and a lower insulator adapted to be coupled to the lower side of the stator core; a printed circuit board adapted to mount an integrated circuit device thereon and having a shaft insertion hole formed at the center thereof and power terminal pin holes formed at the corresponding positions to the power terminal pins; an end cover adapted to be coupled to the housing in such a manner as to be located on the top of the printed circuit board and having a motor shaft coupling portion formed at the center thereof; and at least one or more screws adapted to be inserted into screw holes formed on the top peripheral portion of the housing and having screw heads formed thereon, the screw heads being engagedly coupled to the peripheral portion of the end cover and the end portions of the screws being brought into contact with the stator core.

According to the present invention, desirably, the upper insulator has mag mates disposed on one side of the top portion thereof in such a manner as to insert mag mate terminals connected to coils thereinto, and the power terminal pins are connected to the top portions of the mag mate terminals.

According to the present invention, desirably, the motor further includes power terminal connectors adapted to be inserted into the power terminal pin holes, and each power terminal connector includes: an insertion portion coupled to each power terminal pin hole; a connection portion electrically connected to the insertion portion and the printed circuit board; and a pin press fitting portion formed inside the insertion portion so as to allow each power terminal pin to be pressedly fitted thereto.

According to the present invention, desirably, the printed circuit board further includes a thermal conductor disposed on the top of the integrated circuit device, the thermal conductor having a height capable of being brought into contact with the end cover.

According to the present invention, desirably, the housing comprises seating grooves formed along the inner peripheral wall of the upper portion of the hollow portion in such a manner as to fixedly insert edge portions of the printed circuit board thereinto.

To accomplish the above objects, according to a second aspect of the present invention, there is provided a motor including: a housing formed by means of insert injection molding in such a manner as to locate a stator assembly inside a mold and having a hollow portion formed at the inside thereof and power terminal pins exposed above the hollow portion, the stator assembly having a stator core, an upper insulator adapted to be coupled to the upper side of the stator core, and a lower insulator adapted to be coupled to the lower side of the stator core; a printed circuit board adapted to mount an integrated circuit device thereon and having a shaft insertion hole formed at the center thereof and power terminal pin holes formed at the corresponding positions to the power terminal pins; an end cover adapted to be coupled to the housing in such a manner as to be located on the top of the printed circuit board and having a motor shaft coupling portion formed at the center thereof; and at least one or more grounding pins adapted to be inserted into grounding pin holes formed on the top peripheral portion of the hollow portion of the housing in such a manner as to be brought into contact with the stator core disposed inside the housing and the end cover.

Advantageous Effects of Invention

According to the present invention, the motor according to the present invention achieves easy assembly, prevents the damage of the bearing caused by the static electricity, reduces manufacturing cost, provides simple structure, and enhances heat radiation efficiency.

MODE FOR THE INVENTION

Figure 1:
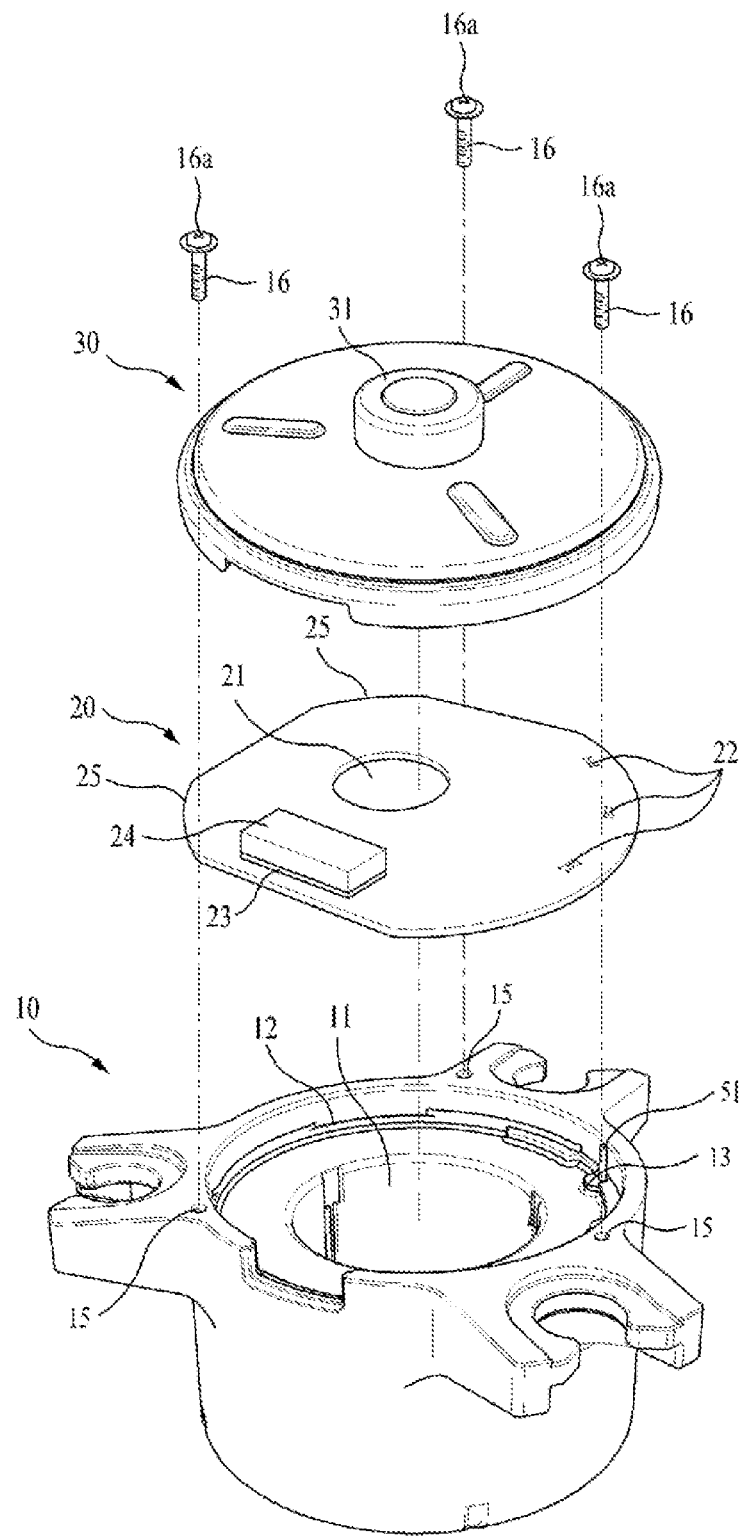
FIG. 1 is an exploded perspective view showing a structure of a motor according to the present invention.

FIG. 1 is an exploded perspective view showing a structure of a motor according to the present invention.

As shown in FIG. 1, the motor according to the present invention largely includes a housing 10 adapted to have a stator assembly located at the inside thereof, a printed circuit board 20 on which a variety of devices are mounted; and an end cover 30 adapted to cover the top side of the printed circuit board 20.

After the stator assembly is located inside a mold, the housing 10 is made of BMC resin by means of injection molding. The housing 10 has a hollow portion 11 formed at the center thereof, and a rotor (not shown) is insertedly disposed into the hollow portion 11. The rotor is connected on the center thereof to a motor shaft in such a manner as to be rotated together with the motor shaft, and one end of the motor shaft is passed through the lower side of the housing 10 in such a manner as to be exposed to the outside, while the other end thereof is being passed through a shaft insertion hole 21 of the printed circuit board 20 in such a manner as to be seated on a motor shaft coupling portion 31 of the end cover 30.

The hollow portion 11 of the housing 10 is coupled on the top side thereof to the printed circuit board 20, and so as to perform the coupling with the printed circuit board 20, thus, the housing 10 has at least one or more seating grooves 12 formed on the top side of the hollow portion 11, that is, along the inner side periphery thereof. The seating grooves 12 are formed to seat edge portions 25 of the printed circuit board 20 thereon, thereby fixing the printed circuit board 20 thereto.

So as to conduct power supply to the stator assembly disposed in the resin molded housing 10, it is necessary to perform the electrical connection with the printed circuit board 20. Thus, at least one or more power terminal pins 51 are formed protrudedly from the stator assembly to the inside of the housing 10. Generally, three power terminal pins 51 for the connection to the three phases u, v and w are needed. The power terminal pins 51 are exposed through power terminal pin exposing portions 13 formed on the housing 10. The power terminal pin exposing portions 13 form the positions through which the power terminal pins 51 are exposed, which are formed upon the injection molding of the housing 10, and the number of power terminal pin exposing portions 13 is the same as the power terminal pins 51. In FIG. 1, three power terminal pins 51 are provided. The exposed power terminal pins 51 are located inside power terminal pin holes 22 formed on the printed circuit board 20 if the printed circuit board 20 is coupled to the housing 10.

At least one or more screw holes 15 are formed around the top peripheral portion of the housing 10 to which the end cover 30 is coupled. In FIG. 1, three screw holes 15 are provided. Screws 16 are inserted correspondingly into the screw holes 15, and the ends of the screws 16 are brought into contact with a stator core 41 located inside the housing 10. Heads 16a formed on the top portions of the screws 16 are engaged with the peripheral portion of the end cover 30 to allow the end cover 30 to be fixed rigidly to the housing 10. Through the above-mentioned structure, the screws 16 serve to send the static electricity generated from a motor shaft coupling portion 31 of the end cover 30 to the stator core 41 and at the same time to fix the end cover 30 to the housing 10.

The printed circuit board 20 has the shaft insertion hole 21 formed on the center thereof in such a manner as to pass the motor shaft therethrough. Further, the printed circuit board 20 is coupled to the top side of the hollow portion 11 of the housing 10. At this time, the power terminal pins 51 are insertedly coupled to the power terminal pin holes 22. So as to easily perform the electrical connection to the power terminal pins 51, desirably, power terminal connectors (see a reference numeral 70 in FIG. 4) are insertedly coupled to the power terminal pin holes 22. The printed circuit board 20 has an integrated circuit device 23 mounted thereon, and so as to radiate the heat generated from the integrated circuit device 23, a thermal conductor 24 is mounted on the top of the integrated circuit device 23. The thermal conductor 24 has a height capable of being brought into contact with the end cover 30. Desirably, the thermal conductor 24 is made of conductive silicone and adapted to rapidly transmit the heat generated from the integrated circuit device 23 to the end cover 30, thereby efficiently cooling the heat generated from the integrated circuit device 23.

The edge portions 25 are formed on the edges of the printed circuit board 20 and are not limited in shape if they can be inserted into the seating grooves 12 of the housing 10. In FIG. 1, the edge portions 25 have round arc-like shapes capable of being fixed to the seating grooves 12.

The end cover 30 is coupled to the top portion of the housing 10 in such a manner as to cover the top portion of the printed circuit board 20. The coupling is not specially limited, but desirably carried out by means of forced fitting. The end cover 30 has the motor shaft coupling portion 31 formed on the center thereof. The motor shaft is disposed inside the motor shaft coupling portion 31 and has a bearing (not shown) mounted therealong so as to rotate gently.

Figure 2:
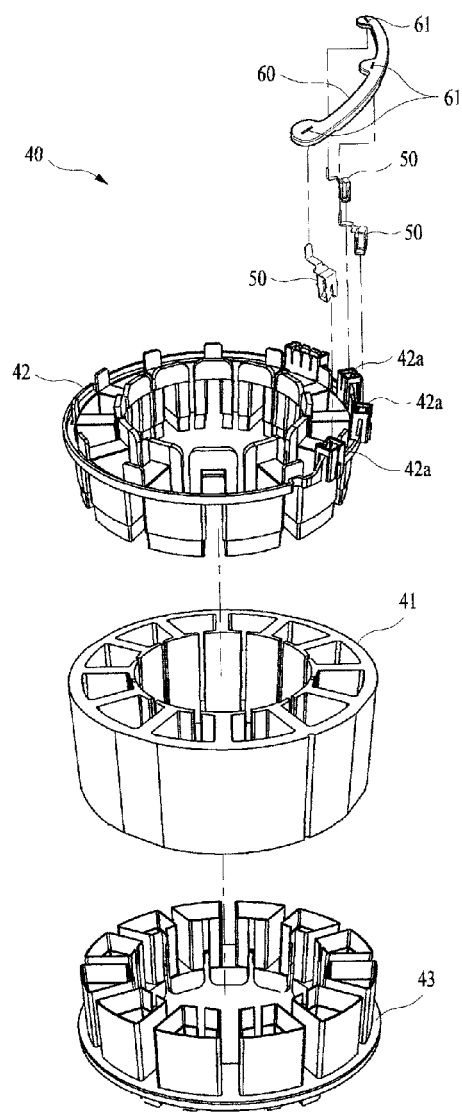
FIG. 2 is an exploded perspective view showing a stator assembly of the motor according to the present invention.

FIG. 2 is an exploded perspective view showing a stator assembly in the motor according to the present invention.

The stator assembly 40 as shown in FIG. 2 is located inside the housing 10. That is, the insert injection molding is carried out in the state where the stator assembly 40 is located in the mold, thereby making the housing 10. As shown in FIG. 2, the stator assembly 40 includes the stator core 41, an upper insulator 42 adapted to be coupled to the upper portion of the stator core 41 and a lower insulator 43 adapted to be coupled to the lower portion of the stator core 41. In the state where the upper insulator 42 and the lower insulator 43 are coupled to the stator core 41, coils are wound. If the coils having the phases u, v and w are wound, one side ends of the coils are connected to a common terminal, and the other side ends thereof are connected to respective mag mates 42a.

The mag mates 42a are disposed on the upper insulator 42 in such a manner as to insert mag mate terminals 50 thereinto. A detailed structure of each mag mate terminal 50 will be explained with reference to FIG. 3 as will be discussed later.

The mag mate terminals 50 are inserted into the respective mag mates 42a, and the protruded upper portions of the mag mate terminals 50 are inserted into pin slots 61 formed on a pin guide 60. The pin guide 60 serves to fix the positions of the mag mate terminals 50 upon the insert injection molding of the stator assembly 40.

Figure 3:
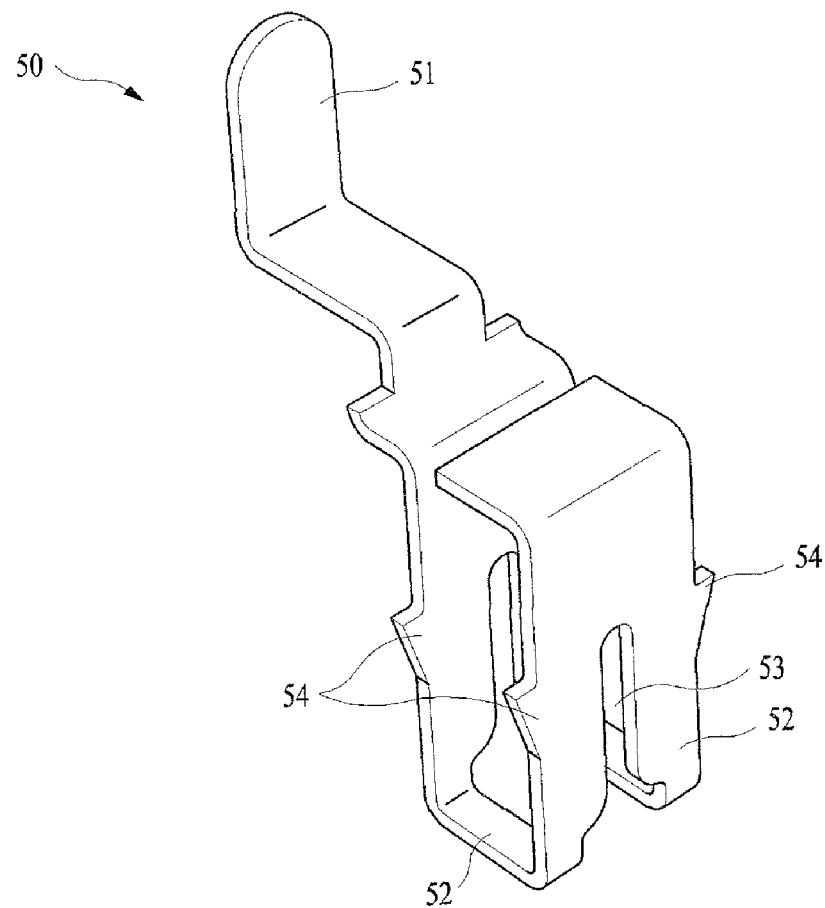
FIG. 3 is a perspective view showing one mag mate terminal in the motor according to the present invention.

FIG. 3 is a perspective view showing one mag mate terminal in the motor according to the present invention.

As shown in FIG. 3, each mag mate terminal 50 includes a power terminal pin 51 protruded from the upper portion thereof, a mag mate insertion portion 52 adapted to be inserted into the mag mate 42a, a coil connection slot 53 through which the coil is insertedly coupled and fixed, and hooks 54 adapted to prevent the upward deviation when coupled to the mag mate 42a.

Figure 4:
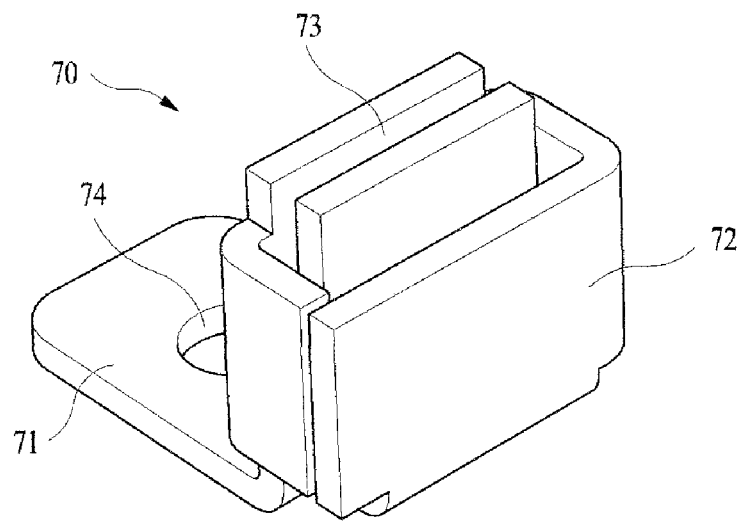
FIG. 4 is a perspective view showing one power terminal connector of the motor according to the present invention.

FIG. 4 is a perspective view showing one power terminal connector in the motor according to the present invention.

As shown in FIG. 4, the power terminal connector 70 is insertedly fixed to each of the power terminal pin holes 22 of the printed circuit board 20 and coupled to the power terminal pin 51 of the mag mate terminal 50, thereby performing the electrical connection. Accordingly, the power terminal connector 70 has a connection portion 71 electrically connected to the printed circuit board 20. An insertion portion 72 of the power terminal connector 70 is inserted into the power terminal pin hole 22, and a pin press fitting portion 73 is formed inside the insertion portion 72. The pin press fitting portion 73 serves to allow the power terminal pin 51 to be fittedly inserted thereinto. A fixing hole 74 is formed on the connection portion 71 and serves to increase the coupling force through a screw or a separate fixing member when the power terminal connector 70 is coupled to the printed circuit board 20.

Figure 5:
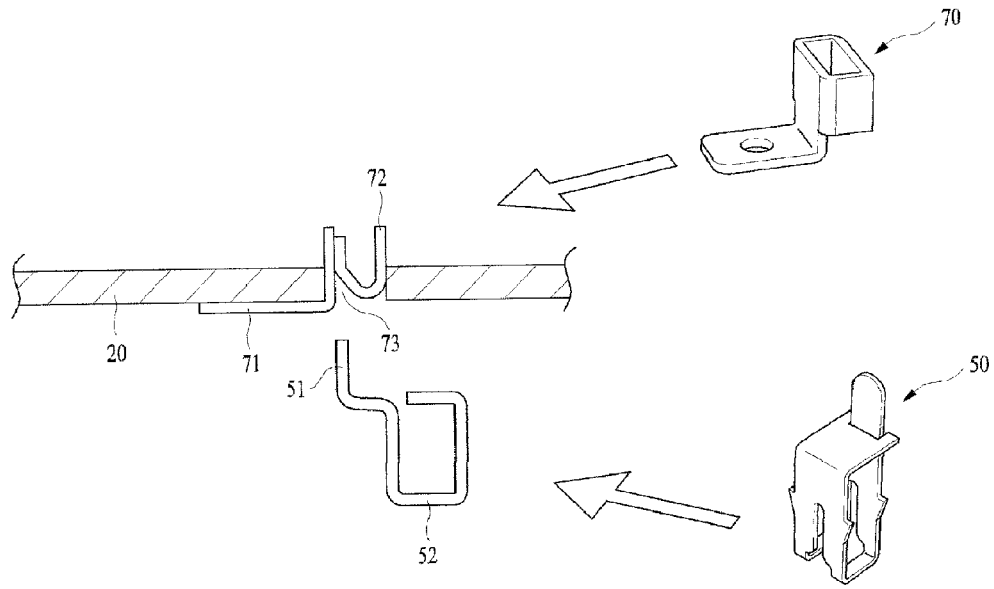
FIG. 5 is a conceptual view showing a state where the power terminal pin of the mag mate terminal is inserted into the power terminal connector mounted on a printed circuit board in the motor according to the present invention.

FIG. 5 is a conceptual view showing a state where the power terminal pin of the mag mate terminal is inserted into the power terminal connector mounted on a printed circuit board in the motor according to the present invention.

As shown in FIG. 5, the power terminal connector 70 is inserted into the power terminal pin hole 22 of the printed circuit board 20. The connection portion 71 of the power terminal connector 70 is electrically connected to the lead wire of the printed circuit board 20 and fixed to the printed circuit board 20.

The insertion portion 72 of the power terminal connector 70 is located into the power terminal pin hole 22, and the pin press fitting portion 73 thereof has a shape capable of allowing the power terminal pin 51 to be fittedly inserted thereinto. As shown in FIG. 5, the pin press fitting portion 73 is bent to have a U-like shape at the inner side thereof, and one side of the U-like shape is formed brought into contact with the inner side of the power terminal pin 51, so that if the power terminal pin 51 is inserted into the pin press fitting portion 73, the electrical connection between them can be conducted with the pressure applied through the U-like shape of the pin press fitting portion 73. The mag mate insertion portion 52 of the mag mate terminal 50 is inserted into the mag mate 42a of the stator assembly 40.

Figure 6:
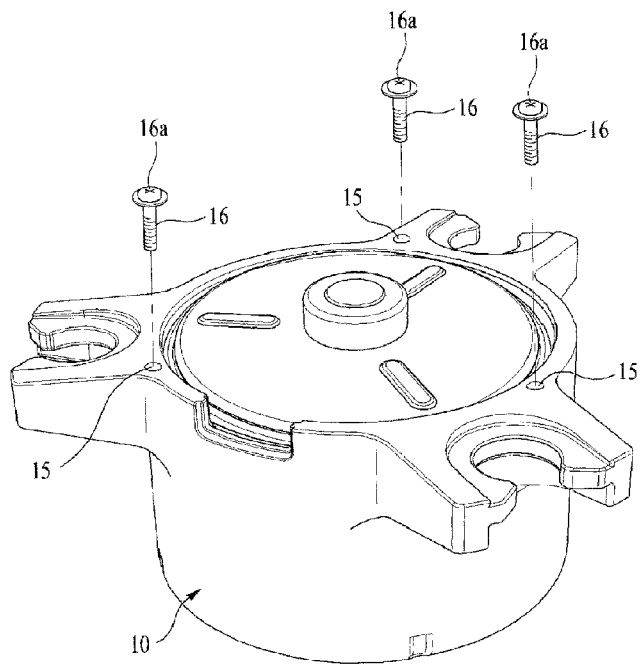
FIG. 6 is an exploded perspective view showing the state before screws are coupled to the motor according to the present invention.
Figure 7:
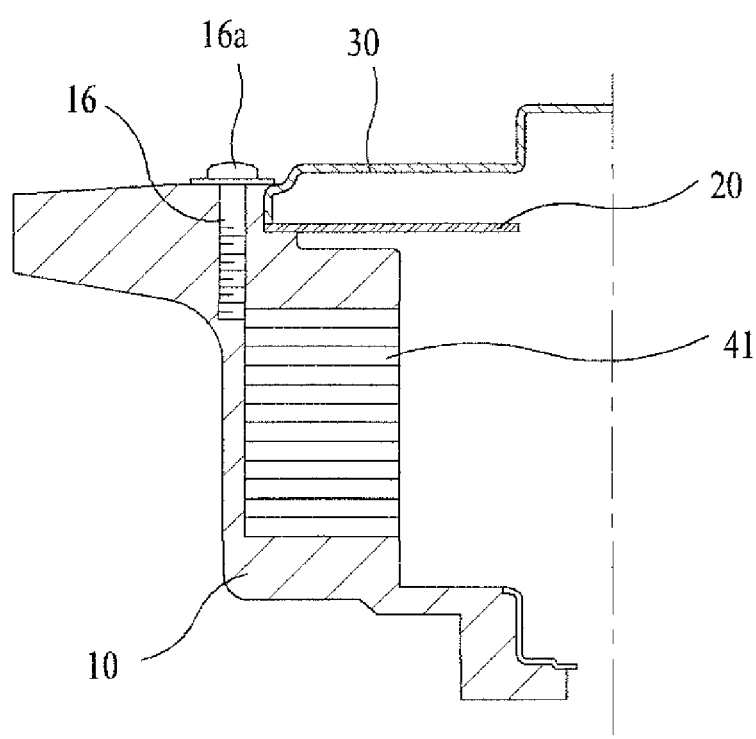
FIG. 7 is a partial sectional view showing the state where the screws are coupled to the motor according to the present invention.

FIG. 6 is an exploded perspective view showing the state before screws are coupled to the motor according to the present invention, and FIG. 7 is a partial sectional view showing the state where the screws are coupled to the motor according to the present invention.

Referring to FIGS. 6 and 7, the heads 16a of the screws 16 are engagedly coupled to the peripheral portion of the end cover 30m, and the ends of the screws 16 are brought into contact with the stator core 41, so that the static electricity generated from the motor shaft coupling portion 31 of the end cover 30 is discharged to the stator core 41, thereby preventing the bearing mounted on the motor shaft coupling portion 31 from being damaged due to the static electricity. Furthermore, the heads 16a of the screws 16 serve to fix the peripheral portion of the end cover 30, thereby preventing the end cover 30 from being escaped from the right position thereof.

Figure 8:
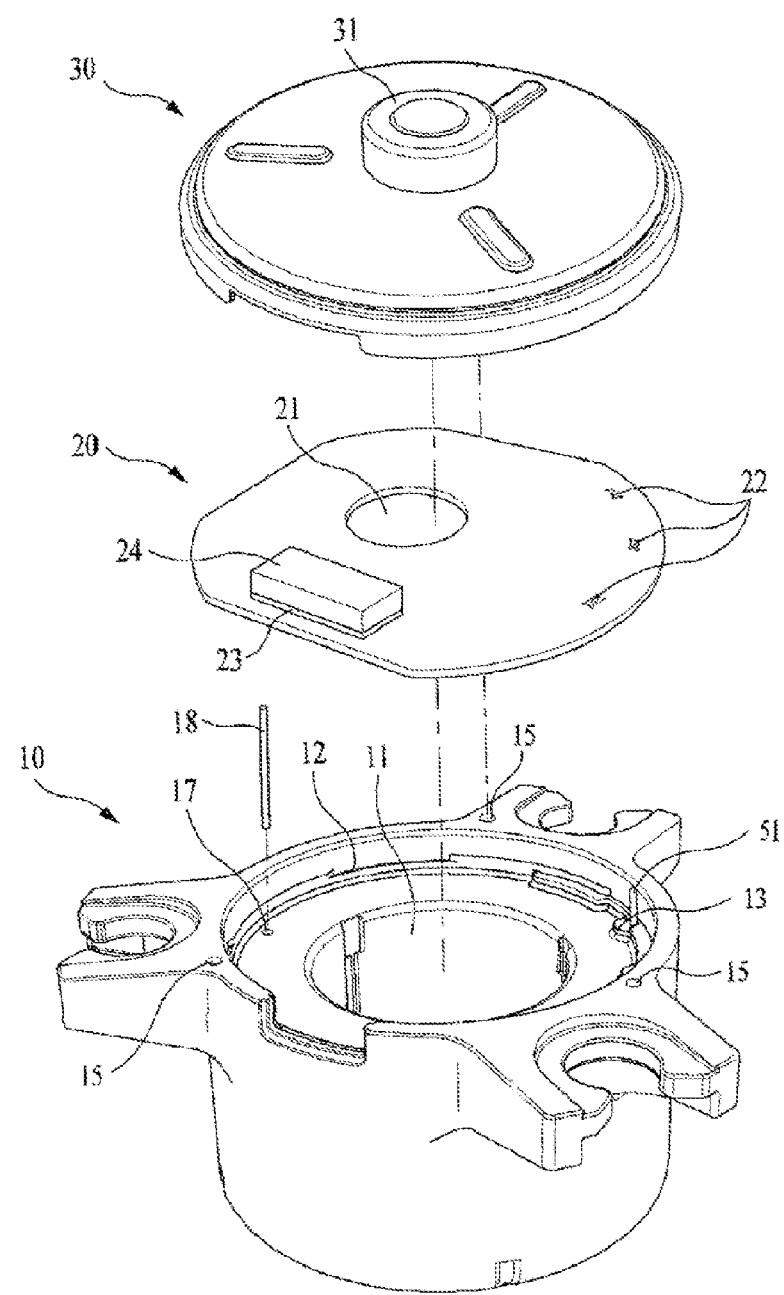
FIG. 8 is an exploded perspective view showing grounding pins applied to the motor according to the present invention.
Figure 9:
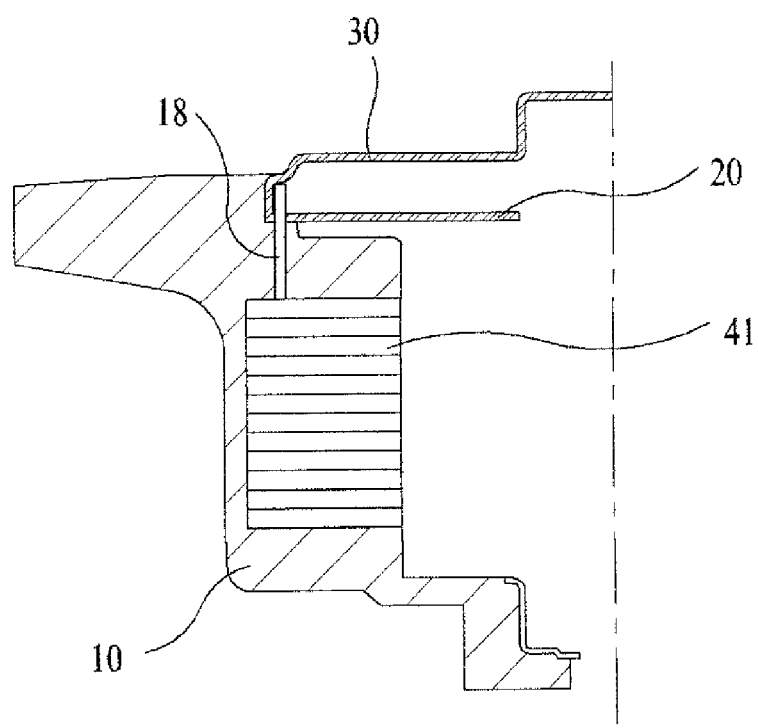
FIG. 9 is a partial sectional view showing the state where the grounding pins are coupled to the motor according to the present invention.

FIG. 8 is an exploded perspective view showing grounding pins applied to the motor according to the present invention, and FIG. 9 is a partial sectional view showing the state where the grounding pins are coupled to the motor according to the present invention.

As shown in FIG. 8, one or more grounding pin holes 17 are formed on the peripheral portion of the hollow portion 11 of the housing 10.

Grounding pins 18 are inserted into the grounding pin holes 17. Each grounding pin 18 is brought into contact with the stator core 41 at one end thereof and with the end cover 30 at the other end thereof. As a result, the static electricity generated from the motor shaft coupling portion 31 of the end cover 30 is discharged to the stator core 41, thereby preventing the bearing mounted on the motor shaft coupling portion 31 from being damaged due to the static electricity.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A motor comprising:
   a housing formed by means of insert injection molding in such a manner as to locate a stator assembly inside a mold and having a hollow portion formed at the inside thereof and power terminal pins exposed above the hollow portion, the stator assembly having a stator core, an upper insulator adapted to be coupled to the upper side of the stator core, and a lower insulator adapted to be coupled to the lower side of the stator core;
   a printed circuit board adapted to mount an integrated circuit device thereon and having a shaft insertion hole formed at the center thereof and power terminal pin holes formed at the corresponding positions to the power terminal pins;
   an end cover adapted to be coupled to the housing in such a manner as to be located on the top of the printed circuit board and having a motor shaft coupling portion formed at the center thereof; and
   at least one or more screws adapted to be inserted into screw holes formed on the top peripheral portion of the housing and having screw heads formed thereon, the screw heads being engagedly coupled to the peripheral portion of the end cover and the end portions of the screws being brought into contact with the stator core.

2. The motor according to claim 1, wherein the upper insulator has mag mates disposed on one side of the top portion thereof in such a manner as to insert mag mate terminals connected to coils thereinto, and the power terminal pins are connected to the top portions of the mag mate terminals.

3. The motor according to claim 1, further comprising power terminal connectors adapted to be inserted into the power terminal pin holes, each power terminal connector comprising:
   an insertion portion coupled to each power terminal pin hole;
   a connection portion electrically connected to the insertion portion and the printed circuit board; and
   a pin press fitting portion formed inside the insertion portion so as to allow each power terminal pin to be pressedly fitted thereto.

4. The motor according to claim 1, wherein the printed circuit board further comprises a thermal conductor disposed on the top of the integrated circuit device, the thermal conductor having a height capable of being brought into contact with the end cover.

5. A motor comprising:
   a housing formed by means of insert injection molding in such a manner as to locate a stator assembly inside a mold and having a hollow portion formed at the inside thereof and power terminal pins exposed above the hollow portion, the stator assembly having a stator core, an upper insulator adapted to be coupled to the upper side of the stator core, and a lower insulator adapted to be coupled to the lower side of the stator core;
   a printed circuit board adapted to mount an integrated circuit device thereon and having a shaft insertion hole formed at the center thereof and power terminal pin holes formed at the corresponding positions to the power terminal pins;
   an end cover adapted to be coupled to the housing in such a manner as to be located on the top of the printed circuit board and having a motor shaft coupling portion formed at the center thereof; and
   at least one or more grounding pins adapted to be inserted into grounding pin holes formed on the top peripheral portion of the hollow portion of the housing in such a manner as to be brought into contact with the stator core disposed inside the housing and the end cover.

* * * * *